(12) United States Patent
Wang et al.

(10) Patent No.: US 10,275,839 B2
(45) Date of Patent: Apr. 30, 2019

(54) FEEDBACK-BASED RECOMMENDATION OF MEMBER ATTRIBUTES IN SOCIAL NETWORKS

(71) Applicant: LinkedIn Corporation, Mountain View, CA (US)

(72) Inventors: Qin Iris Wang, Cupertino, CA (US); Mohammad H. Firooz, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 265 days.

(21) Appl. No.: 15/219,619

(22) Filed: Jul. 26, 2016

(65) Prior Publication Data

US 2018/0032616 A1    Feb. 1, 2018

(51) Int. Cl.
G06F 7/00    (2006.01)
G06F 17/30    (2006.01)
G06Q 50/00    (2012.01)

(52) U.S. Cl.
CPC .................................. *G06Q 50/01* (2013.01)

(58) Field of Classification Search
CPC .......... G06F 17/30867; G06F 17/3053; G06Q 30/0631; G06Q 50/01
USPC ................................ 707/733, 734, 748, 749
See application file for complete search history.

(56) References Cited

U.S. PATENT DOCUMENTS

| | | | |
|---|---|---|---|
| 7,720,720 B1 * | 5/2010 | Sharma | G06Q 30/0631 705/26.7 |
| 9,886,288 B2 * | 2/2018 | Baird | G06F 17/243 |
| 2009/0164897 A1 | 6/2009 | Amer-yahia et al. | |
| 2009/0271826 A1 * | 10/2009 | Lee et al. | H04N 5/44543 725/46 |
| 2014/0136933 A1 | 5/2014 | Berger et al. | |
| 2015/0381670 A1 | 12/2015 | Jain et al. | |
| 2016/0078489 A1 * | 3/2016 | Hu | G06Q 30/0269 705/14.66 |
| 2016/0379170 A1 | 12/2016 | Pande | |
| 2017/0061392 A1 * | 3/2017 | Meza-Guinea | G06Q 10/1095 |
| 2018/0032615 A1 | 2/2018 | Wang et al. | |

OTHER PUBLICATIONS

"Non Final Office Action Issued in U.S. Appl. No. 15/219,609", dated Jul. 13, 2018, 35 Pages.
"Final Office Action Issued in U.S. Appl. No. 15/219,609", dated Jan. 25, 2019, 30 Pages.

* cited by examiner

*Primary Examiner* — Md I Uddin
(74) *Attorney, Agent, or Firm* — Park, Vaughan, Fleming & Dowler LLP; Chia-Hsin Suen

(57) ABSTRACT

The disclosed embodiments provide a system for improving use of a social network. During operation, the system obtains a set of member features associated with a member of a social network and a set of attribute features associated with a set of member attributes. Next, the system analyzes the member features and the attribute features to predict a propensity of the member to accept recommendations of the member attributes as profile edits to a member profile of the member. The system then uses the predicted propensity to output a subset of the member attributes as recommended profile edits to the member.

14 Claims, 8 Drawing Sheets

FEEDBACK-BASED RECOMMENDATION OF MEMBER ATTRIBUTES IN SOCIAL NETWORKS

RELATED APPLICATION

The subject matter of this application is related to the subject matter in a co-pending non-provisional application by the same inventors as the instant application and filed on the same day as the instant application, entitled "Feedback-Based Standardization of Member Attributes in Social Networks," having Ser. No. 15/219,609, and filing date 26 Jul. 2016.

BACKGROUND

Field

The disclosed embodiments relate to social networks. More specifically, the disclosed embodiments relate to techniques for performing feedback-based recommendation of member attributes in social networks.

Related Art

Social networks may include nodes representing individuals and/or organizations, along with links between pairs of nodes that represent different types and/or levels of social familiarity between the nodes. For example, two nodes in a social network may be connected as friends, acquaintances, family members, classmates, and/or professional contacts. Social networks may further be tracked and/or maintained on web-based social networking services, such as online professional networks that allow the individuals and/or organizations to establish and maintain professional connections, list work and community experience, endorse and/or recommend one another, run advertising and marketing campaigns, promote products and/or services, and/or search and apply for jobs.

In turn, social networks and/or online professional networks may facilitate activities related to business, sales, recruiting, networking, professional growth, and/or career development. For example, sales professionals may use an online professional network to locate prospects, maintain a professional image, establish and maintain relationships, and/or engage with other individuals and organizations. Similarly, recruiters may use the online professional network to search for candidates for job opportunities and/or open positions. At the same time, job seekers may use the online professional network to enhance their professional reputations, conduct job searches, reach out to connections for job opportunities, and apply to job listings. Consequently, use of online professional networks may be increased by improving the data and features that can be accessed through the online professional networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
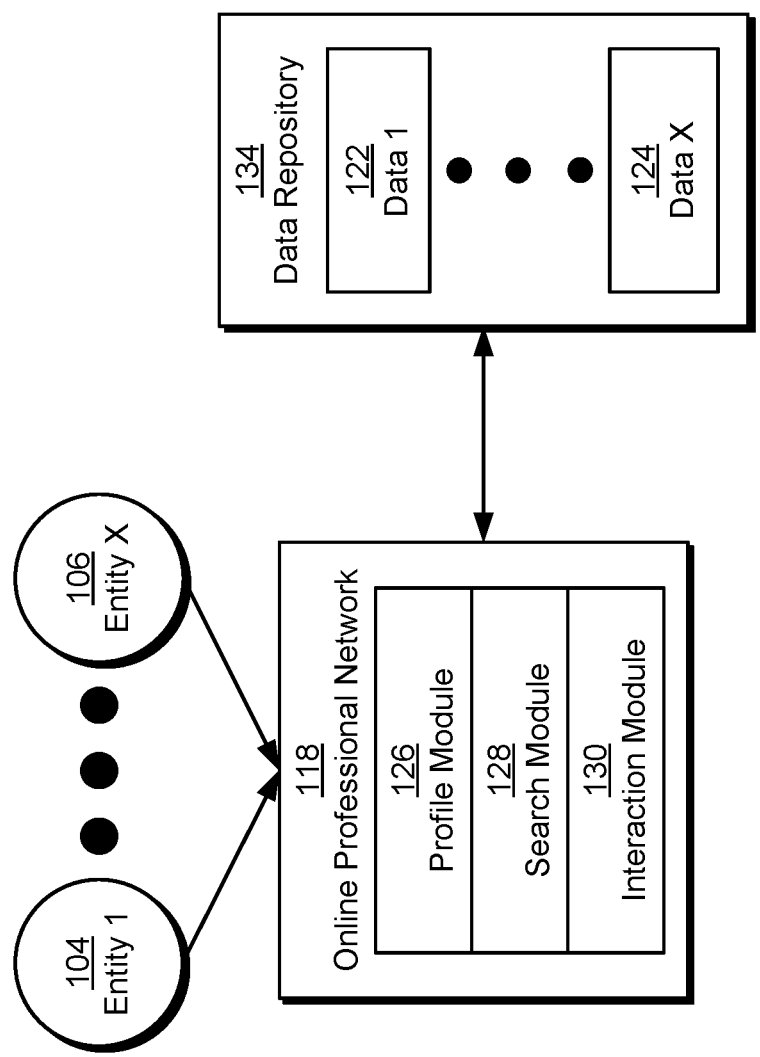
FIG. 1 shows a schematic of a system in accordance with the disclosed embodiments.

The disclosed embodiments provide a method, apparatus, and system for improving use of a social network. As shown in FIG. 1, the social network may include an online professional network 118 that is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use the online professional network to list jobs, search for potential candidates, provide business-related updates to users, advertise, and/or take other action.

The entities may use a profile module 126 in online professional network 118 to create and edit profiles containing information related to the entities' professional and/or industry backgrounds, experiences, summaries, projects, skills, and so on. The profile module may also allow the entities to view the profiles of other entities in the online professional network.

Profile module 126 may also include mechanisms for assisting the entities with profile completion. For example, the profile module may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience. As described in further detail below, such suggestions may improve both the quality and completeness of the profiles, as well as the standardization of the attributes in taxonomies and/or dictionaries for the attributes.

The entities may use a search module 128 to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature on the online professional network to search for profiles, jobs, and/or information by categories such as first name, last name, title, company, school, location, interests, relationship, industry, groups, salary, experience level, etc.

The entities may also use an interaction module 130 to interact with other entities on online professional network 118. For example, the interaction module may allow an entity to add other entities as connections, follow other entities, send and receive messages with other entities, join groups, and/or interact with (e.g., create, share, re-share, like, and/or comment on) posts from other entities.

Those skilled in the art will appreciate that online professional network 118 may include other components and/or modules. For example, the online professional network may include a homepage, landing page, and/or content feed that provides the latest postings, articles, and/or updates from the entities' connections and/or groups to the entities. Similarly, the online professional network may include features or mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in the online professional network may be tracked and stored in a database, data warehouse, cloud storage, and/or other data-storage mechanism providing data repository 134.

Figure 2:
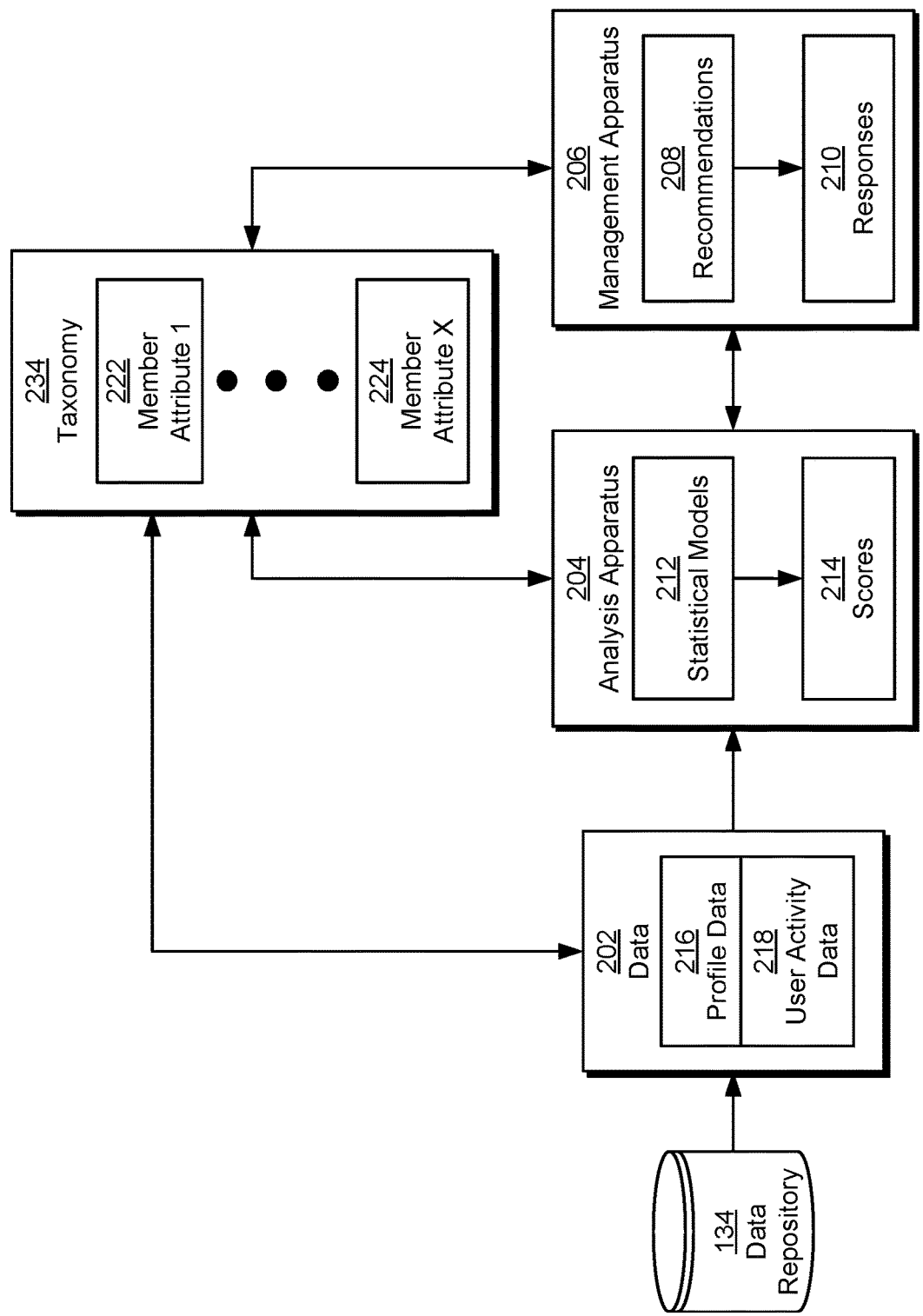
FIG. 2 shows a system for improving use of a social network in accordance with the disclosed embodiments.

As shown in FIG. 2, data repository 134 and/or another primary data store may be queried for data 202 that includes profile data 216 for members of a social network (e.g., online professional network 118 of FIG. 1), as well as user activity data 218 that tracks the members' activity within and/or outside the social network. Profile data 216 may include data associated with member profiles in the social network. For example, profile data for an online professional network may include a set of attributes for each user, such as demographic (e.g., gender, age range, nationality, location, language), professional (e.g., job title, professional summary, employer, industry, experience, skills, seniority level, professional endorsements), social (e.g., organizations of which the user is a member, geographic area of residence), and/or educational (e.g., degree, university attended, certifications, publications) attributes. The profile data may also include a set of groups to which the user belongs, the user's contacts and/or connections, and/or other data related to the user's interaction with the social network.

Attributes of the members may be matched to a number of member segments, with each member segment containing a group of members that share one or more common attributes. For example, member segments in the social network may be defined to include members with the same industry, location, and/or language.

Connection information in profile data 216 may additionally be combined into a graph, with nodes in the graph representing entities (e.g., users, schools, companies, locations, etc.) in the social network. In turn, edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

User activity data 218 may include records of member interactions with one another and/or content associated with the social network. For example, the user activity data may be used to track impressions, clicks, likes, dislikes, shares, hides, comments, posts, updates, conversions, and/or other user interaction with content in the social network. The user activity data may also track other types of activity, including connections, messages, and/or interaction with groups or events Like profile data 216, the user activity data may be used to create a graph, with nodes in the graph representing social network members and/or content and edges between pairs of nodes indicating actions taken by members, such as creating or sharing articles or posts, sending messages, connection requests, joining groups, and/or following other entities.

In one or more embodiments, profile data 216 and user activity data 218 are used to improve the standardization and/or recommendation of member attributes (e.g., member attribute 1 222, member attribute x 224) found in member profiles of the members. The member attributes may include values of location, skills, titles, industries, companies, schools, summaries, publications, patents, and/or other fields in the member profiles. The member attributes may be extracted from profile data 216 in data repository 134 and used to create and/or update a taxonomy 234 of one or more types of member attributes.

Taxonomy 234 may be used to organize and/or classify member attributes in profile data 216. For example, skills in the profile data may be organized into a hierarchical taxonomy that is stored in data repository 134 and/or another repository. The taxonomy may model relationships between skills (e.g., "Java programming" is related to or a subset of "software engineering") and/or normalize identical or highly related skills (e.g., "Java programming," "Java development," "Android development," and "Java programming language" are normalized to "Java").

As mentioned above, a profile module (e.g., profile module 126 of FIG. 1) in the social network may include functionality to recommend or suggest profile edits to the member's profiles. More specifically, a management apparatus 206 may generate a set of recommendations 208, with each recommendation containing one or more member attributes from taxonomy 234 that are determined to be relevant to the member profile of a given member. For example, the management apparatus may generate the recommendations based on existing fields in the member profile, relationships among member attributes in the taxonomy, the presence of the member attributes in member profiles of similar members and/or the member's connections, publicly available data, and/or other types of data or inference.

Management apparatus 206 and/or another component may display recommendations 208 within a graphical user interface (GUI) and/or application (e.g., web application, mobile application, native application, etc.) for accessing the social network. For example, the recommendations may be displayed within a content feed, profile-completion feature, recommendation feature, and/or another feature associated with the social network. The recommendations may also, or instead, be delivered via email, a messaging service, one or more notifications, and/or another mechanism for communicating or interaction with the member.

Management apparatus 206 may also track responses 210 of the members to recommendations 208. For example, the user may have the option of accepting, rejecting, or ignoring a recommended member attribute. The management apparatus may categorize the acceptances as positive responses, the rejections as negative responses, and the ignores as neutral or ambiguous responses to the recommendations. Each response may be stored with an identifier of the corresponding member, an identifier of the recommendation to which the response was made, identifiers of one or more recommended member attributes in the recommendation, a timestamp of the response, and/or other data.

An analysis apparatus 204 may apply a number of statistical models 212 to profile data 216, user activity data 218, taxonomy 234, and/or responses 210 to produce a number of scores 214 for assessing the quality of recommendations 208 and/or the associated member attributes. One set of scores may represent acceptance rates of the member attributes as profile edits by members of the social network. For example, the analysis apparatus may apply a statistical model to the responses and features associated with the members and/or member attributes to generate the acceptance rates as values ranging from 0 (i.e., complete non-acceptance) to 100 (i.e., complete acceptance). In turn, the acceptance rates may be used by analysis apparatus 204 and/or management apparatus 206 to standardize and/or improve taxonomy 234. For example, member attributes with low acceptance rates may be removed from the taxonomy, and member attributes with high acceptance rates may be added to the taxonomy. Using acceptance rates of member attributes to standardize taxonomies of the member attributes is described in further detail below with respect to FIG. 3.

Another set of scores 214 may represent the members' propensities to accept recommendations 208 of the corresponding member attributes as profile edits to the members' profiles. For example, the analysis apparatus may apply a different statistical model to features associated with the members, member attributes, and/or responses 210 to calculate the scores as probabilities ranging from 0 (i.e., highly unlikely to accept a recommendation) to 100 (i.e., highly likely to accept the recommendation). The scores may then be used by management apparatus 206 to improve the recommendations. For example, the management apparatus may select member attributes with predicted propensities that exceed a threshold for inclusion in the recommendations, thereby increasing the relevance of the recommendations to the members. Using predicted propensities of accepting member attributes to generate recommendations of the member attributes is described in further detail below with respect to FIG. 4.

By improving taxonomy 234 and recommendations 208 based on data 202 from data repository 134 and responses 210 to the recommendations, the system of FIG. 2 may increase the completeness, accuracy, and quality of member profiles in the social network. In turn, the system may increase the value of the social network to the members, the value provided by the member to the social network, and/or member engagement with the social network.

Those skilled in the art will appreciate that the system of FIG. 2 may be implemented in a variety of ways. First, analysis apparatus 204, management apparatus 206, and/or data repository 134 may be provided by a single physical machine, multiple computer systems, one or more virtual machines, a grid, one or more databases, one or more filesystems, and/or a cloud computing system. Analysis apparatus 204 and management apparatus 206 may additionally be implemented together and/or separately by one or more hardware and/or software components and/or layers.

Second, a number of statistical models 212 and/or techniques may be used to generate scores 214. For example, the functionality of each statistical model may be provided by a regression model, artificial neural network, support vector machine, decision tree, random forest, gradient boosting tree, naïve Bayes classifier, Bayesian network, clustering technique, hierarchical model, and/or ensemble model. Moreover, the same statistical model or separate statistical models may be used to generate scores for various members, member segments, member attributes, and/or types of member attributes in the social network. For example, one statistical model may be used to calculate scores representing acceptance rates of member attributes by the members, and a different statistical model may be used to calculate scores for predicting the members' propensities to accept recommendations of the member attributes as profile edits. In a second example, a separate statistical model may be used to characterize and/or predict the acceptance rates and/or acceptance propensities of member attributes by a different member and/or member segment of the social network. In a third example, multiple statistical models may be used to generate scores 214 for different types of member attributes (e.g., skills, titles, industries, companies, schools, summaries, groups, etc.) in the social network.

Figure 3:
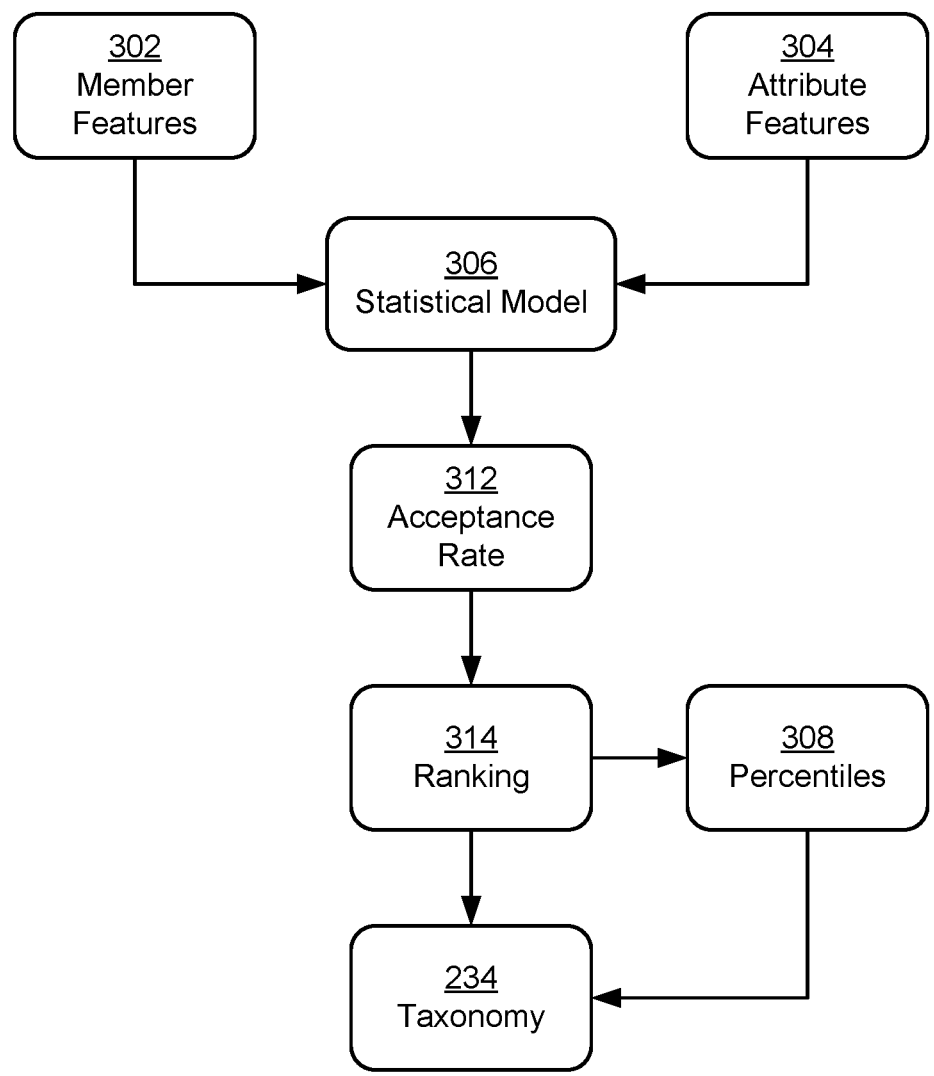
FIG. 3 shows the standardization of member attributes in a social network in accordance with the disclosed embodiments.

FIG. 3 shows the standardization of member attributes in a social network in accordance with the disclosed embodiments. As mentioned above, a statistical model 306 may be used to predict an acceptance rate 312 of a member attribute by a set of members and/or a member segment in the social network. For example, the statistical model may be used to estimate the rate at which the members and/or member segment accept the member attributes as recommended profile edits for member profiles in the social network.

Acceptance rate 312 may be generated using member features 302 and attribute features 304. The member features may include profile attributes from the members' profiles with the social network, such as each member's title, skills, work experience, education, seniority, industry, location, and/or profile completeness. The member features may also include each member's number of connections in the social network and/or the member's level of activity in the social network. The activity level may be binary (e.g., indicating that the member is dormant or active), or the activity level may be calculated by aggregating different types of activities into an overall activity count and/or a bucketized activity score. The member features may also include attributes that are specific to one or more features in the social network, such as a classification of the member as a job seeker or non-job-seeker in an online professional network.

One or more member features 302 may also be used to identify a member segment in the social network. For example, the member's language, industry, and/or country may be used to define a member segment for the member. The member segment may also be provided as input to statistical model 306, or a different version of the statistical model may be used to calculate acceptance rates for different member segments in the social network.

Attribute features 304 may identify member attributes and/or characterize the usage of the member attributes in the social network. The attribute features may include a standardized form of a member attribute, such as a unique identifier that represents a set of identical and/or similar skills (e.g., "Java," "Java programming," "Java development," "Android development," "Java programming language"). The attribute features may also include a flag indicating if the member attribute is currently trending or not, as well as one or more member responses (e.g., responses 210 of FIG. 2) to previous recommendations of the member attribute, which can be positive, negative, neutral, and/or ambiguous.

Member features 302 and attribute features 304 may be provided as input to statistical model 306, and acceptance rate 312 may be obtained as output from the statistical model. For example, the statistical model may be a random forest classifier that uses a set of decision trees to generate a score ranging from 0 to 100 for each member attribute. The score may represent the percentage acceptance rate of each member attribute by members in a particular member segment and/or members across the social network. The statistical model may be trained using a subset of member features and attribute features collected over a pre-specified period (e.g., the last six months). The remainder of the member and attribute features collected over the same period may then be used to calculate the acceptance rates of member attributes that have been extracted from member profiles in the social network.

Acceptance rate 312 may then be used to generate a ranking 314 of the member attributes. For example, the member attributes may be ranked in descending order of acceptance rate, so that member attributes with the highest acceptance rates are at the top of the ranking and member attributes with the lowest acceptance rates are at the bottom of the ranking.

Finally, ranking 314 may be used to update taxonomy 234. For example, a subset of highest-ranked member attributes from the ranking may be included in the taxonomy and/or provided as candidates for inclusion in the taxonomy, and another subset of lowest-ranked member attributes from the ranking may be excluded from the taxonomy and/or provided as candidates for exclusion from the taxonomy. In other words, the acceptance rates may be used as indicators of quality for the member attributes, which in turn may be used to standardize the member attributes in the taxonomy.

One or more subsets of member attributes used in standardizing or updating taxonomy 234 may be identified based on percentiles 308 associated with the ranking. For example, member attributes with acceptance rates that are equal to or higher than the $90^{th}$ percentile acceptance rate may be selected for inclusion in the taxonomy, and member attributes with acceptance rates that are equal to or lower than the $10^{th}$ percentile acceptance rate may be selected for exclusion from the taxonomy. The subsets may also, or instead, be defined based on numeric thresholds for the acceptance rates, such that member attributes with acceptance rates that are above a first threshold (e.g., 15%) are selected for inclusion in the taxonomy and member attributes with acceptance rates that are below a second threshold (e.g., 1%) are selected for exclusion from the taxonomy.

Figure 4:
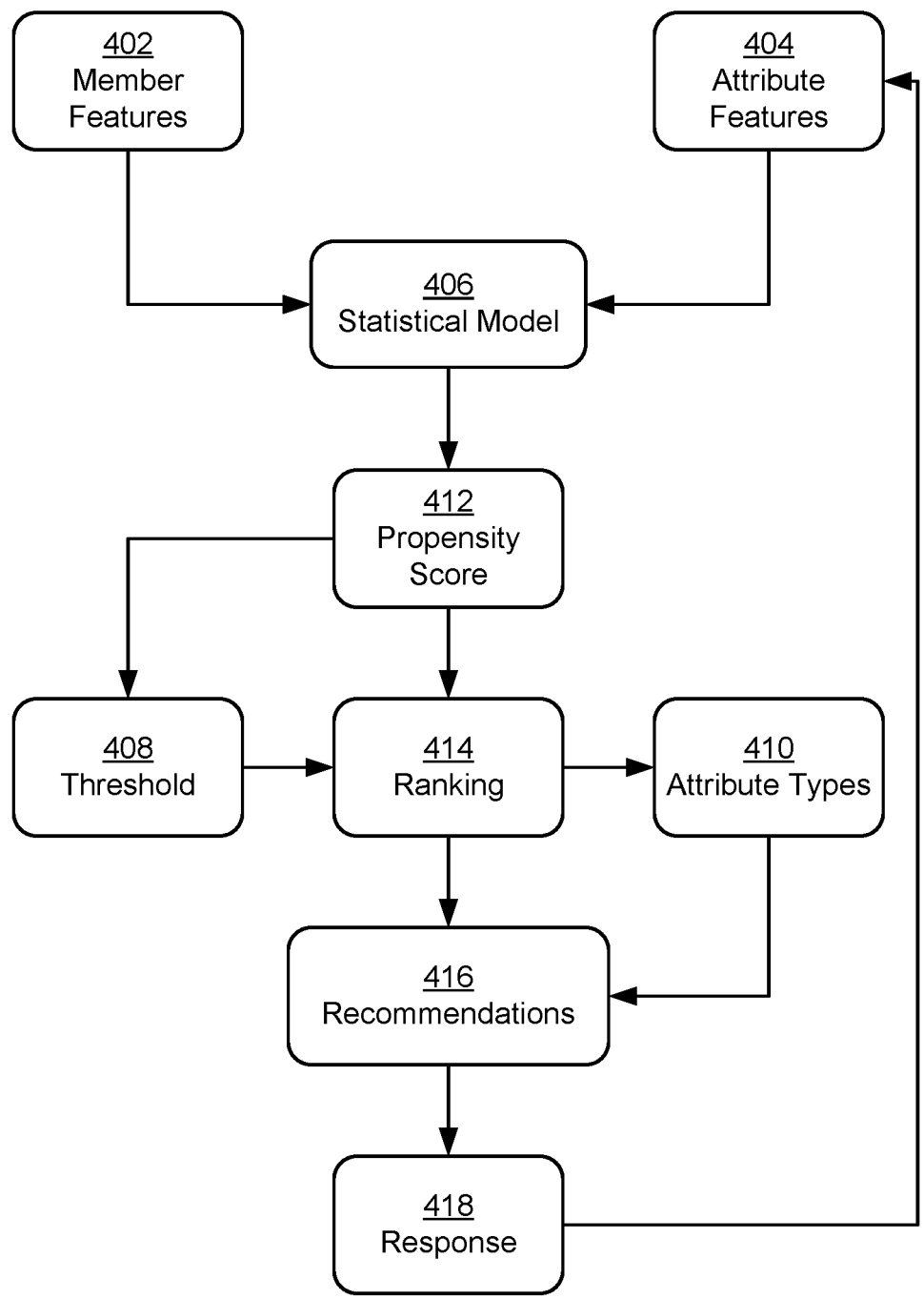
FIG. 4 shows the recommendation of member attributes in a social network in accordance with the disclosed embodiments.

FIG. 4 shows the recommendation of member attributes in a social network in accordance with the disclosed embodiments. As with the standardization of member attributes discussed above with respect to FIG. 3, a set of recommendations 416 of member attributes as profile edits may be generated based on output from a statistical model 406.

To produce the output, a set of member features 402 and a set of attributes features 404 may be provided as input to statistical model 406. The member features may include current and/or previous member attributes in the member profile of a member in a social network. For example, the member features may include the current and/or previous title, skills, work experience, education, seniority, industry, location, publications, certifications, patents, and/or other attributes listed in the member's profile with the social network. Because the member is likely to be connected to other members with similar attributes, the member features may also be supplemented with member attributes of the member's connections, such as skills, companies, schools, and/or industries of the connections.

Member features 402 may also include the member's number of connections and/or level of activity in the social network. The activity level may be binary (e.g., dormant or active), or the activity level may be calculated by aggregating different types of activities into an overall activity count and/or a bucketized activity score. The member features may also include attributes that are specific to one or more features in the social network, such as a classification of the member as a job seeker, non-job-seeker, influencer, and/or non-influencer in an online professional network.

One or more member features 402 may also be used to identify a member segment in the social network. For example, the member's language, industry, and/or country may be used to define a member segment for the member. The member segment may be provided as input to statistical model 406, or a different version of the statistical model may be used to calculate acceptance rates for different member segments in the social network.

Attributes features 404 may identify the member attributes and/or characterize the usage of the member attributes in the social network. The attribute features may include a standardized form of a member attribute, such as a unique identifier for a set of identical and/or similar skills (e.g., "Java," "Java programming," "Java development," "Android development," "Java programming language"). The attribute features may also include a flag indicating if the member attribute is currently trending (or currently not trending), as well as the member's responses (e.g., responses 210 of FIG. 2) to previous recommendations of the member attribute, which can be positive, negative, neutral, and/or ambiguous.

Member features 402 and attribute features 404 may be provided as input to statistical model 406, and a propensity score 412 may be obtained as output from the statistical model. For example, the statistical model may be a random forest and/or gradient boosted tree that uses a set of decision trees to generate a score from 0 to 100 representing the likelihood of the member in accepting a recommendation of a member attribute as a profile edit to the member's profile in the social network. A higher propensity score may indicate a higher chance of acceptance, and a lower propensity score may indicate a lower chance of acceptance. The statistical model may be trained using member features and attribute features collected over a pre-specified period (e.g., the last six months), including member responses to recommendations 416 over the period. The statistical model may then be used to predict the member's responses to future recommendations of member attributes as profile edits.

Propensity score 412 may be calculated for each member and a set of candidate member attributes. For example, a different value of the propensity score may be produced for the member and each member attribute in a taxonomy of member attributes in the social network, such as taxonomy 234 of FIG. 2.

Values of propensity score 412 may then be used to generate recommendations 416 of one or more member attributes as profile edits to the member. First, a subset of member attributes with propensity scores that are higher than a threshold 408 may be identified. For example, member attributes with propensity scores that are higher than a pre-specified value (e.g., 65%) may be identified. Next, a ranking 414 of the identified subset may be generated. For example, member attributes in the subset may be ranked in descending order of propensity, so that member attributes that are most likely to be accepted by the user are at the top of the ranking and member attributes that are least likely to be accepted by the user are at the bottom of the ranking.

Ranking 414 may then be used to output recommendations 416 of the member attributes as profile edits to the member. For example, member attributes may be recommended to the member in the order in which the member attributes appear in the ranking. The recommendations may also be generated based on attribute types 410 that identify the profile fields (e.g., title, industry, skills, company, school, publication, etc.) to which the member attributes pertain. For example, a number of member attributes in the ranking with the same attribute types (e.g., four member attributes that are skills) and similar values for propensity 412 may be outputted in the same recommendation. In another example, multiple member attributes with the same predicted propensity may be ordered for inclusion in the recommendations based on the relative importance of the corresponding attribute types and/or the attribute types of member attributes in previous recommendations to the user.

The member's response 418 to recommendations 416 may also be tracked and used to update attribute features 404 and/or statistical model 406. For example, the member's positive, negative, neutral, and/or ambiguous responses to recommended member attributes may be used to tailor the statistical model to the member and/or member segment. The performance of the statistical model may thus improve as user feedback to the recommendations is collected.

Figure 5:
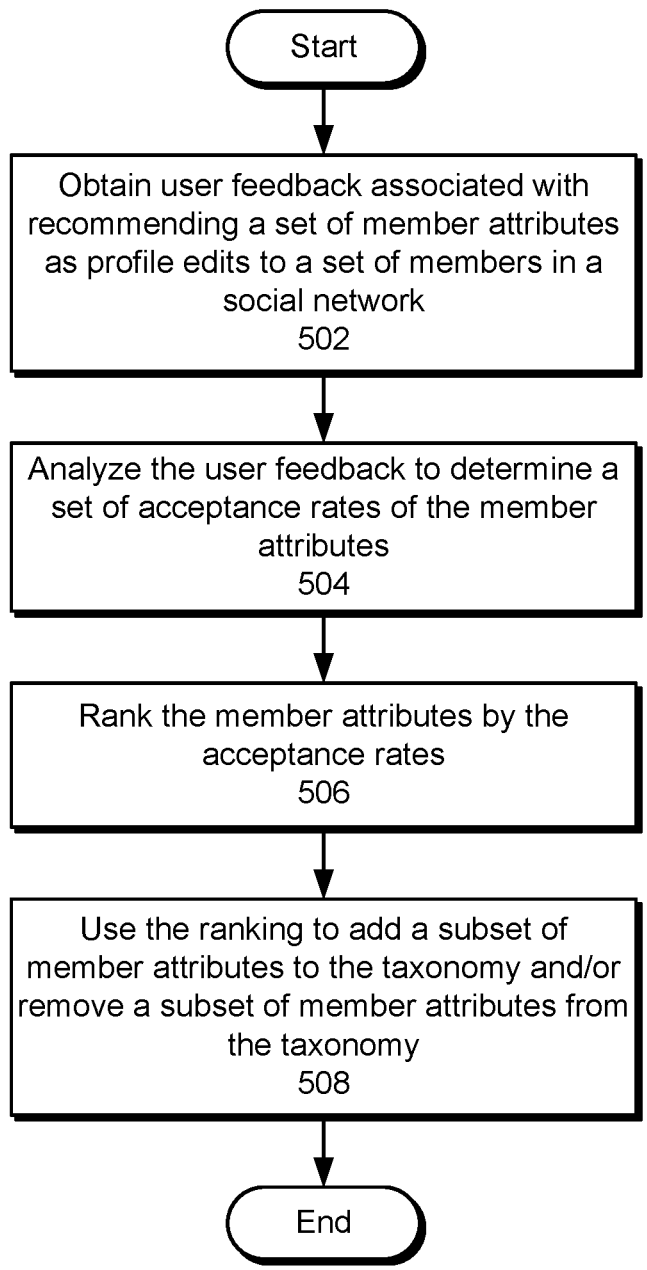
FIG. 5 shows a flowchart illustrating the process of standardizing member attributes in a social network in accordance with the disclosed embodiments.

FIG. 5 shows a flowchart illustrating the process of standardizing member attributes in a social network in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, user feedback associated with recommending a set of member attributes as profile edits to a set of members in a social network is obtained (operation 502). The user feedback may include positive, negative, neutral, and/or ambiguous responses to recommendations of the member attributes to the members. The member attributes may include skills, titles, industries, companies, schools, summaries, publications, certifications, and/or other values related to fields in member profiles in the social network.

Next, the user feedback is analyzed to determine a set of acceptance rates of the member attributes (operation 504). For example, a statistical model may be applied to the user feedback, a set of features associated with the user feedback, and/or a member segment in the social network, and the acceptance rates may be obtained as output from the statistical model. The features may include a trending indicator for a member attribute (e.g., a flag indicating if the member attribute is currently trending or not), a job seeker status of a member, and/or an activity level of the member. The user feedback may include a standardized form of a member attribute and/or a member response to the member attribute.

The acceptance rates are then used to update a taxonomy of the member attributes. To update the taxonomy, the member attributes are ranked by the acceptance rates (operation 506), and the ranking is used to add a subset of member attributes to the taxonomy and/or remove a different subset of member attributes from the taxonomy (operation 508). For example, the member attributes may be ranked in descending order of acceptance rate. Within the ranking, member attributes with acceptance rates at or above the 90th percentile acceptance rate may be included in the taxonomy, and member attributes with acceptance rates at or below the $10^{th}$ percentile acceptance rate may be excluded from the taxonomy. Because the updated taxonomy better reflects member acceptance of the member attributes, the taxonomy may improve subsequent recommendations of the member attributes to the members, as described in further detail below with respect to FIG. 6.

Figure 6:
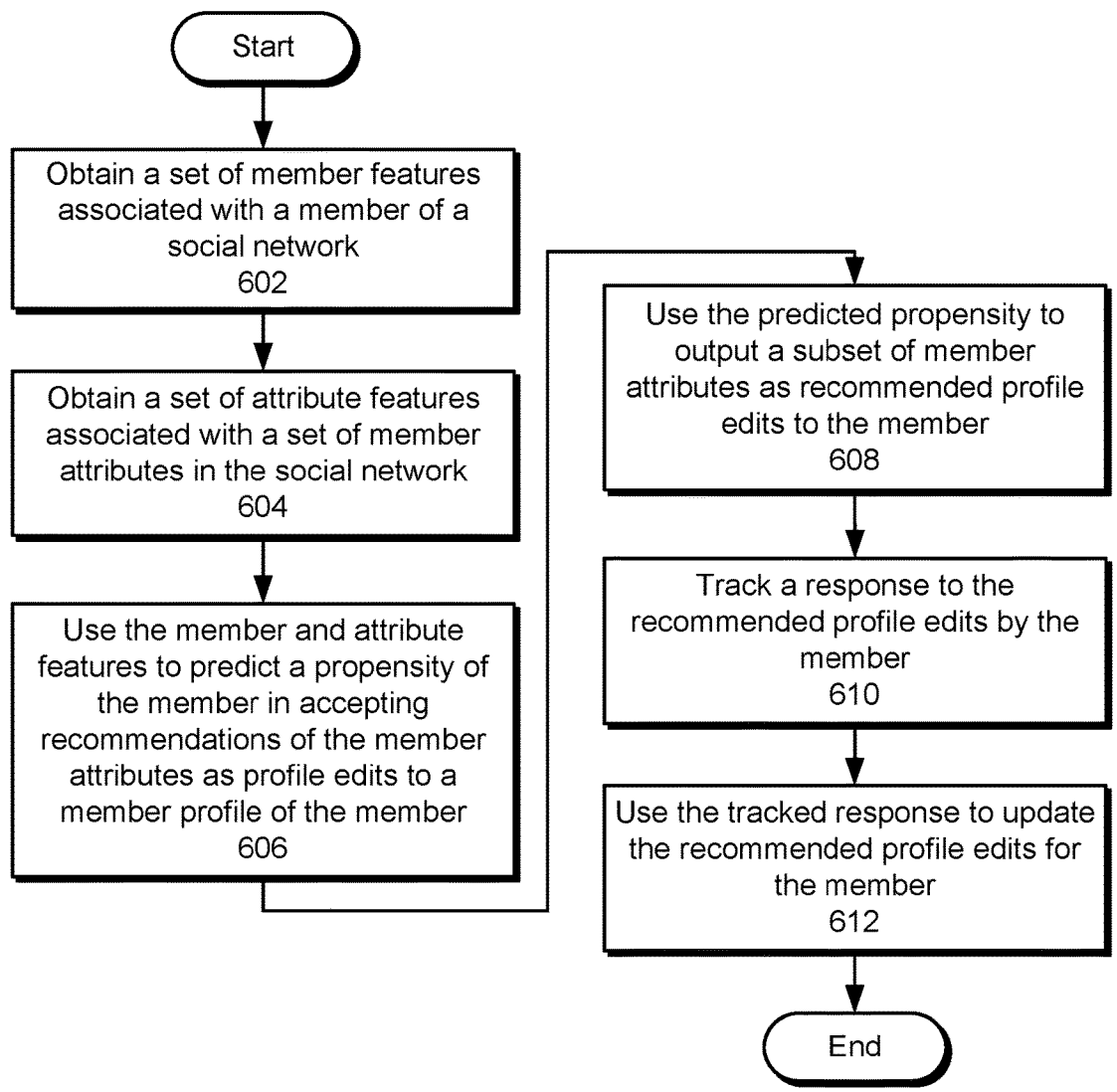
FIG. 6 shows a flowchart illustrating the recommendation of member attributes in a social network in accordance with the disclosed embodiments.

FIG. 6 shows a flowchart illustrating the recommendation of member attributes in a social network in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, a set of member features associated with a member of a social network is obtained (operation 602), along with a set of attribute features associated with a set of member attributes in the social network (operation 604). The member attributes may be obtained from a taxonomy that is standardized using user feedback from members of the social network, as described above. The member features may include a current member attribute of the member (e.g., current position), a previous member attribute of the member (e.g., a previous position), a job-seeking status of the member, an activity level of the member, and/or a member attribute of a connection of the member. The attribute features may include a trending indicator for a member attribute (e.g., a flag indicating whether the member attribute is currently trending) and/or a member response to a recommendation of the member attribute.

Next, the member and attribute features are used to predict a propensity of the member to accept recommendations of the member attributes as profile edits to a member profile of the member (operation 606). For example, the features may be used to estimate the likelihood of the user accepting each member attribute as a recommended profile edit to the member's profile with the social network. The predicted propensity is then used to output a subset of member attributes as recommended profile edits to the member (operation 608), as described in further detail below with respect to FIG. 7.

A response to the recommended profile edits by the member is tracked (operation 610) and used to update the recommended profile edits for the member (operation 612). For example, the member's acceptance, rejection, and/or lack of response to a member attribute as a suggested profile edit may be included in the attribute features of the member attribute. The updated attribute features may then be used in subsequent prediction of the member's propensity in accepting the recommendations, which may improve the predicted propensities and recommendations over time. Operations 610-612 may be repeated in a feedback loop that continuously tracks the member's responses to recommended profile edits and updates subsequent recommendations accordingly. Thus, recommended profile edits for the member may evolve or improve over time.

Figure 7:
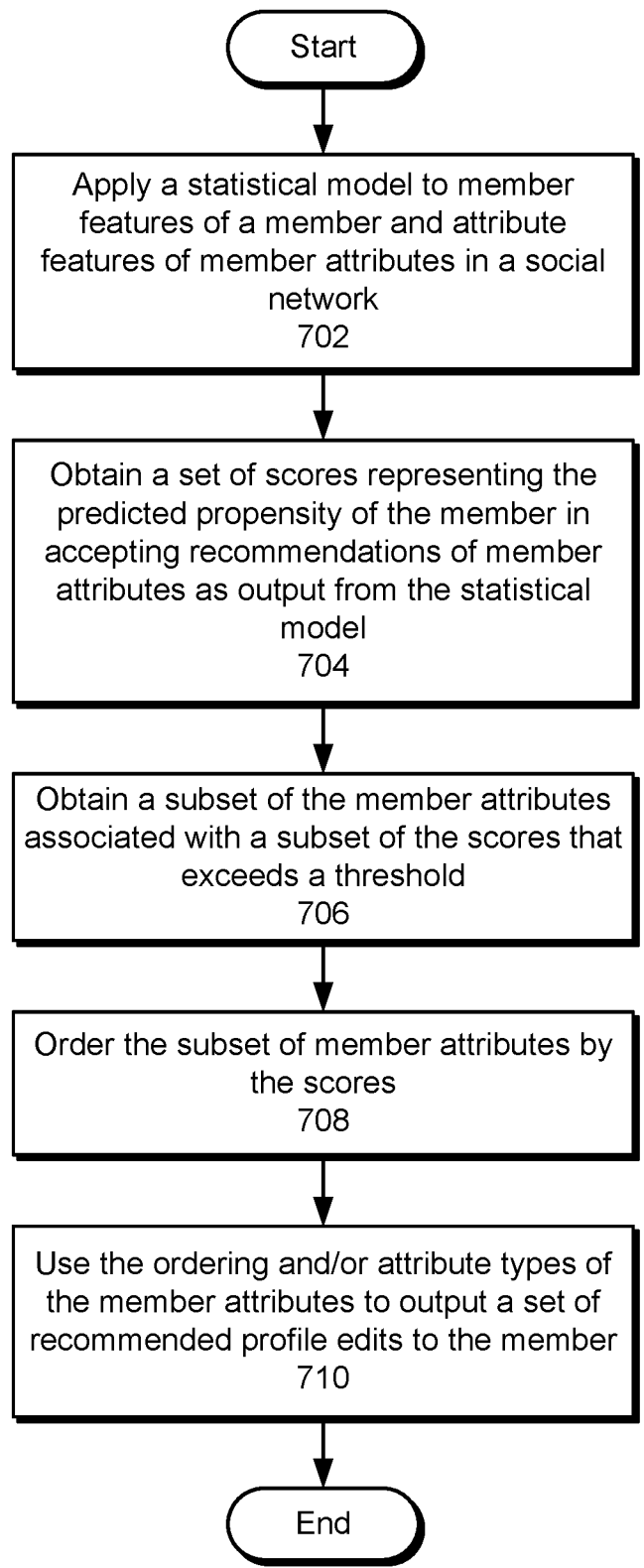
FIG. 7 shows a flowchart illustrating the process of recommending profile edits to a member of a social network in accordance with the disclosed embodiments.

FIG. 7 shows a flowchart illustrating the process of recommending profile edits to a member of a social network in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

First, a statistical model is applied to member features of the member and attribute features of member attributes in the social network (operation 702), and a set of scores representing the predicted propensity of the member to accept recommendations of member attributes is obtained as output from the statistical model (operation 704). For example, the statistical model may be used to predict the member's likelihood of accepting each member attribute as a recommended profile edit to the member's profile with the social network. Scores outputted from the model may range from 0 to 100, with 0 representing little to no likelihood of accepting the member attribute and 100 representing close to certain acceptance of the member attribute.

Next, a subset of the member attributes associated with a subset of scores that exceeds a threshold is obtained (operation 706). For example, the scores may be used to exclude member attributes with scores that fall below the threshold as candidates for recommendation to the user. The subset is then ordered by the score (operation 708). For example, remaining member attributes with predicted propensities that exceed the threshold may be ordered in descending order of score.

Finally, the ordering and/or attribute types of the member attributes are used to output a set of recommended profile edits to the member (operation 710). For example, the recommended profile edits may be displayed to the member when the member accesses the social network, in an email to the member, and/or in another form of communication with the member. The recommended profile edits may follow the ordering of the member attributes by the scores, such that member attributes that are most likely to be accepted by the member are displayed before member attributes that are less likely to be accepted by the member. Member attributes of the same attribute type (e.g., skill, title, industry, company, school, summary, etc.) may also be grouped and shown within the same recommendation, and the member may selectively accept or reject each member attribute in the recommendation. The recommendations may also be ordered to prioritize member attributes of certain attribute types (e.g., profile fields considered to be more important to profile quality or completion) over other member attributes of other attribute types (e.g., profile fields considered to be less important to profile quality or completion).

Figure 8:
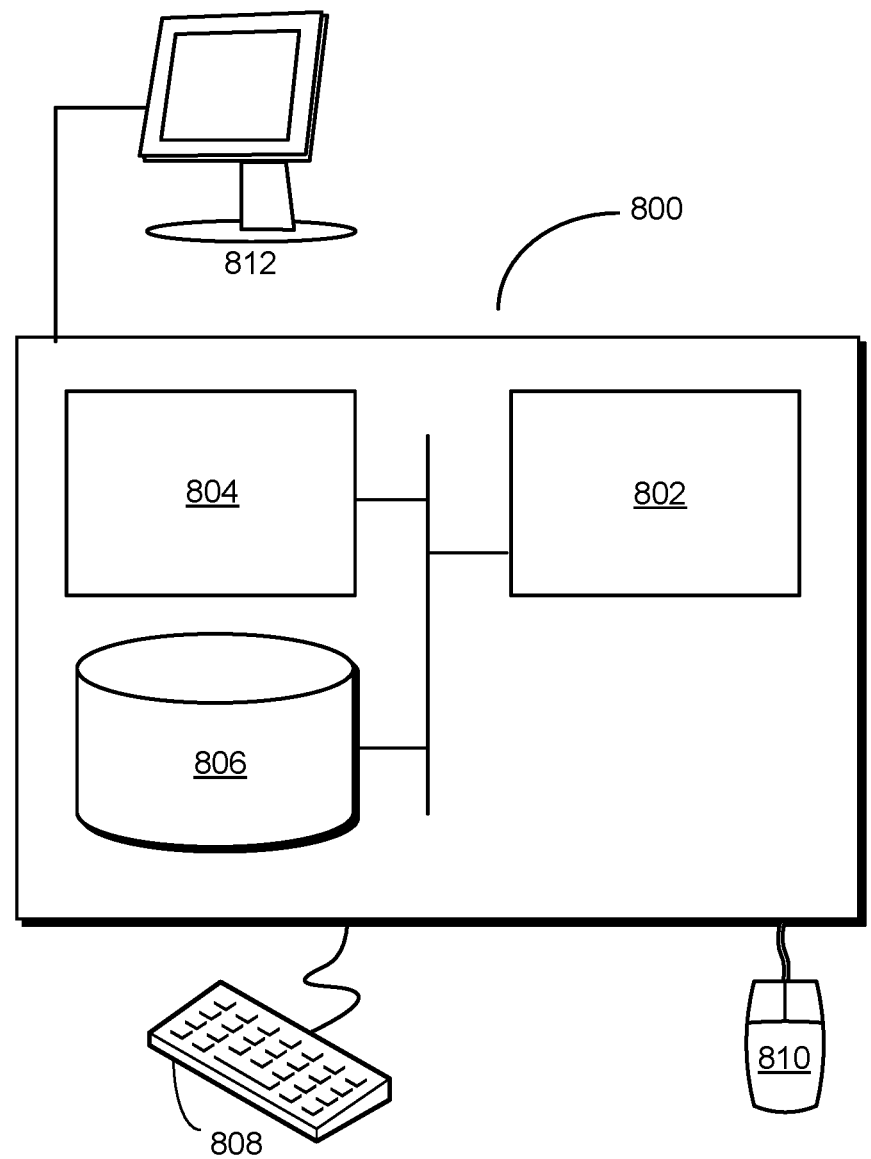
FIG. 8 shows a computer system in accordance with the disclosed embodiments.

FIG. 8 shows a computer system in accordance with the disclosed embodiments. Computer system 800 may correspond to an apparatus that includes a processor 802, memory 804, storage 806, and/or other components found in electronic computing devices. Processor 802 may support parallel processing and/or multi-threaded operation with other processors in computer system 800. Computer system 800 may also include input/output (I/O) devices such as a keyboard 808, a mouse 810, and a display 812.

Computer system 800 may include functionality to execute various components of the present embodiments. In particular, computer system 800 may include an operating system (not shown) that coordinates the use of hardware and software resources on computer system 800, as well as one or more applications that perform specialized tasks for the user. To perform tasks for the user, applications may obtain the use of hardware resources on computer system 800 from the operating system, as well as interact with the user through a hardware and/or software framework provided by the operating system.

In one or more embodiments, computer system 800 provides a system for improving use of a social network. The system includes an analysis apparatus and a management apparatus, one or both of which may alternatively be termed or implemented as a module, mechanism, or other type of system component. The analysis apparatus may obtain user feedback associated with recommending a set of member attributes as profile edits to a set of members in a social network. Next, the analysis apparatus may analyze the user feedback to determine a set of acceptance rates of the member attributes. The management apparatus may then use the acceptance rates to update a taxonomy of the member attributes, which may improve recommendations of the member attributes to the members.

The analysis apparatus may also, or instead, obtain a set of member features associated with a member of a social network and a set of attribute features associated with a set of member attributes. Next, the analysis apparatus may analyze the member features and the attribute features to predict a propensity of the member to accept recommendations of the member attributes as profile edits to a member profile of the member. The management apparatus may then use the predicted propensity to output a subset of the member attributes as recommended profile edits to the member.

In addition, one or more components of computer system 800 may be remotely located and connected to the other components over a network. Portions of the present embodiments (e.g., analysis apparatus, management apparatus, data repository, etc.) may also be located on different nodes of a distributed system that implements the embodiments. For example, the present embodiments may be implemented using a cloud computing system that standardizes and recommends member attributes as profile edits to a set of remote users.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    updating a taxonomy of member attributes, the updating comprising obtaining acceptance rates for recommendations of member attributes as profile edits to a set of members in the social network and ranking the member attributes based on the acceptance rates;
    obtaining a set of member features associated with a member of a social network and a set of attribute features associated with a set of member attributes, the attribute features including member responses to previous recommendations of member attributes;
    analyzing, by one or more computer systems, the member features and the attribute features to predict a propensity of the member to accept recommendations of the member attributes from the taxonomy as profile edits to a member profile of the member, the analyzing comprising:
        applying a statistical model to the member features and the attribute features, the statistical model configured for computing a score for each of a plurality of member attributes that represents a predicted propensity of specified members of the social network to accept recommendations of that member attribute;
        obtaining a set of scores representing the predicted propensity of the member to accept recommendations of the member attributes as output from the statistical model; and
        obtaining a subset of the member attributes associated with a subset of scores that each exceed a threshold, the subset of member attributes being ordered based on the scores:
    outputting, based at least in part on the set of scores, a subset of the member attributes as recommended profile edits to the member; and
    tracking responses to the recommended profile edits by the member and, based on the responses, updating recommended profile edits for the member.

2. The method of claim 1, further comprising:
    ordering the subset of the member attributes by the scores; and
    using the ordering to output the recommended profile edits to the member.

3. The method of claim 1, wherein outputting, based at least in part on the set of scores, the subset of the member attributes as recommended profile edits to the member further comprises:
    selecting a member attribute for outputting in the recommended profile based on an attribute type of the member attribute.

4. The method of claim 1, wherein the set of member features comprises at least one of:
    a current member attribute of the member;
    a previous member attribute of the member;
    a job-seeking status of the member;
    an activity level of the member; and
    a member attribute of a connection of the member.

5. The method of claim 1, wherein the set of attribute features comprises at least one of:
    an trending indicator for a member attribute; and
    a member response to a recommendation of the member attribute.

6. The method of claim 1, wherein the set of member features comprises a member segment of the member.

7. The method of claim 1, wherein the set of member attributes comprises at least one of:
    a skill;
    a title;
    an industry;
    a company;
    a school;
    a publication;
    a certification; and
    a summary.

8. An apparatus, comprising:
    one or more processors; and
    memory storing instructions that, when executed by the one or more processors, cause the apparatus to:
        update a taxonomy of member attributes, the updating comprising obtaining acceptance rates for recommendations of member attributes as profile edits to a set of members in the social network and ranking the member attributes based on the acceptance rates;
        obtain a set of member features associated with a member of a social network and a set of attribute features associated with a set of member attributes, the attribute features including member responses to previous recommendations of member attributes;
        analyze the member features and the attribute features to predict a propensity of the member to accept recommendations of the member attributes from the taxonomy as profile edits to a member profile of the member, the analyzing comprising:
            applying a statistical model to the member features and the attribute features, the statistical model configured for computing a score for each of a plurality of member attributes that represents a predicted propensity of specified members of the social network to accept recommendations of that member attribute;
            obtaining a set of scores representing the predicted propensity of the member to accept recommendations of the member attributes as output from the statistical model; and
            obtaining a subset of the member attributes associated with a subset of scores that each exceed a threshold, the subset of member attributes being ordered based on the scores;
        output, based at least in part on the set of scores, a subset of the member attributes as recommended profile edits to the member; and
        track responses to the recommended profile edits by the member and, based on the responses, updating recommended profile edits for the member.

9. The apparatus of claim 8, further comprising:
    ordering the subset of the member attributes by the scores; and
    using the ordering to output the recommended profile edits to the member.

10. The apparatus of claim 8, wherein outputting, based at least in part on the set of scores, the subset of the member attributes as recommended profile edits to the member further comprises:
    selecting a member attribute for outputting in the recommended profile based on an attribute type of the member attribute.

11. The apparatus of claim 8, wherein the set of member features comprises at least one of:
a current member attribute of the member;
a previous member attribute of the member;
a job-seeking status of the member;
an activity level of the member;
a member attribute of a connection of the member; and
a member segment of the member.

12. The apparatus of claim 8, wherein the set of attribute features comprises at least one of:
an trending indicator for a member attribute; and
a member response to a recommendation of the member attribute.

13. The apparatus of claim 8, wherein the set of member attributes comprises at least one of:
a skill;
a title;
an industry;
a company;
a school;
a publication;
a certification; and
a summary.

14. A system, comprising:
an analysis module comprising a non-transitory computer-readable medium comprising instructions that, when executed, cause the system to:
update a taxonomy of member attributes, the updating comprising obtaining acceptance rates for recommendations of member attributes as profile edits to a set of members in the social network and ranking the member attributes based on the acceptance rates;
obtain a set of member features associated with a member of a social network and a set of attribute features associated with a set of member attributes, the attribute features including member responses to previous recommendations of member attributes; and
analyze the member features and the attribute features to predict a propensity of the member to accept recommendations of the member attributes from the taxonomy as profile edits to a member profile of the member, the analyzing comprising:
applying a statistical model to the member features and the attribute features, the statistical model configured for computing a score for each of a plurality of member attributes that represents a predicted propensity of specified members of the social network to accept recommendations of that member attribute;
obtaining a set of scores representing the predicted propensity of the member to accept recommendations of the member attributes as output from the statistical model; and
obtaining a subset of the member attributes associated with a subset of scores that each exceed a threshold, the subset of member attributes being ordered based on the scores;
a management module comprising a non-transitory computer-readable medium comprising instructions that, when executed, cause the system to:
use the predicted propensity to output a subset of the member attributes as recommended profile edits to the member; and
track responses to the recommended profile edits by the member and, based on the responses, updating recommended profile edits for the member.

* * * * *